358-69.
4-29-75 OR 3,881,182 SR

United States Patent [19]

[11] 3,881,182

Archakov et al.

[45] Apr. 29, 1975

[54] DEVICE FOR COLOR PICTURE REPRODUCTION

[76] Inventors: Valery Ivanovich Archakov, ulitsa Valovaya, 6/8, kv. 73, Moscow; Mikhail Iosifovich Sosnovik, Kanal Griboedova, 8, kv. 25, Leningrad; Vyacheslav Vladimirovich Meister, ulitsa Arbat, 29, kv. 4, Moscow, all of U.S.S.R.

[22] Filed: Mar. 22, 1973

[21] Appl. No.: 344,033

[52] U.S. Cl. .................... 358/69
[51] Int. Cl. .................... H04n 9/24
[58] Field of Search ......... 178/5.4 F, 5.4 H; 358/67, 358/68, 69

[56] References Cited

UNITED STATES PATENTS

| | | | |
|---|---|---|---|
| 2,912,615 | 11/1959 | Lubszynski | 315/12 |
| 2,951,113 | 8/1960 | Farnsworth | 178/5.4 F |
| 3,207,945 | 9/1965 | Goodman | 315/22 |
| 3,748,375 | 7/1973 | Sunstein | 178/5.4 F |

*Primary Examiner*—Robert L. Griffin
*Assistant Examiner*—Mitchell Saffian
*Attorney, Agent, or Firm*—Holman & Stern

[57] ABSTRACT

A device for color picture reproduction with color stripe triplets, guard and index stripes in the screen structure of the display tube. There are first guard stripes between the color stripes in each triplet and second guard stripes between the triplets. The width of the second guard stripes is three times the width of the first guard stripes. The index stripes are located in the middle of the second guard stripes. The device also contains a detector collecting light emitted from the index stripes and an indexing information processing system connected to the detector output and composed of a differentiator in series with an operational amplifier comprising a shaping amplifier for cutting off the operational amplifier during time intervals between the appearance of pulse outputs from the detector. The operational amplifier output is coupled to a writing signal shaping system which forms a writing signal out of the three primary-color signals fed to the device.

2 Claims, 9 Drawing Figures

DEVICE FOR COLOR PICTURE REPRODUCTION

BACKGROUND OF THE INVENTION

The present invention relates generally to the field of color television and more particularly, it relates to devices for color picture reproduction employed, for example, in home television receivers, display monitors, etc.

A device is known in the art for picture reproduction containing a beam-index display tube with color, black guard and index stripes in the screen structure, a photocell for collecting index stripe emission light, and an indexing information processing system connected to the photocell output and controlling a system which produces a writing signal (needed for driving the display tube) out of the three primary-color input signals, with its output connected to the control electrode of the color tube gun. In the known device color, guard and index stripes in the screen structure are of the same width, the index stripes being applied on the guard stripes, and the index frequency is usually three-seconds or three-fourths times the color triplet frequency.

The indexing information processing system in the known devices comprises bandpass filters for detecting the harmonic components of the index signal, amplifiers, limiters, and a regenerative frequency divider. A large number of low-pass filters introduces a considerable time delay of the index signal which imposes stringent requirements on linearity and stability of scanning (about 1 percent) and gives rise to additional difficulties in the processing of indexing information.

The use of a regenerative frequency divider makes it necessary to ensure proper phasing of the index signal, since otherwise the indexing information obtained will not be unambiguous. To overcome this difficulty, the frequency divider is started at the start of each line scan by index pulses obtained from "run-in" stripes located at the left-hand edge of the screen beyond the visible image, the frequency of the index pulse being equal to the writing frequency.

Besides, the different spacing of the color and index (including run-in) stripes seriously complicates the technology of the color tube screen in the known device.

SUMMARY OF THE INVENTION

It is an object of this invention to provide a device for color picture reproduction wherein an indexing information processing system does not require conversion of the subcarrier-frequency signal into the writing-frequency signal and, consequently, detection of harmonic components by low-pass filters, and wherein special run-in systems, are not needed.

It is another object of the invention to provide a device for color picture reproduction with equal spacing of index and color stripes in the screen structure which ensures effective time-domain separation of the writing and indexing functions.

In carrying out the invention, there shall be provided a device for color picture reproduction comprising a beam-index display tube with color, guard and index stripes in the screen structure, an index stripe emission detector, an indexing information processing system connected to the detector output and controlling a system which produces a writing signal (needed to drive the display tube) out of the three primary-color input signals, with its output connected to the control electrode of the display tube gun, wherein, in accordance with the invention, the indexing information processing system contains a differentiator in series connection with an operational amplifier with the feedback circuit thereof including a shaping amplifier which cuts off the operational amplifier for time periods not exceeding time periods between beam scanning of the index lines located in the middle of increased-width guard stripes which separate color triplets and equal three times the width of the guard stripes between the color stripes of one triplet.

In the device for color picture reproduction wherein a writing signal shaping system employs three primary-color switches and a delay line, it is recommended to use a pulse-width modulator driving the shaping amplifier in the feedback circuit with each of its inputs coupled to one input of the primary-color switches which receive color information corresponding to colors of the screen phosphor stripes adjacent to an index stripe.

The device for color picture reproduction embodying the present invention dispenses with conversion of the subcarrier-frequency signal into the writing-frequency signal and permits shaping of the modulating (writing) signal by means of pulses without detecting the harmonic component of the index signal. The indexing information processing circuits have a large bandwidth and introduce a signal delay smaller than, or equal to, the triplet-scan period which extends scanning non-linearity and instability tolerances by about an order.

The proposed device has a small number of adjustable elements. All stripes can be applied from the same original pattern with facilitates the technology of the tube screen considerably.

The device of the present invention possesses high noise immunity because it is based on the principle of cutting off the indexing information processing system during time intervals between the appearance of the indexing pulses. The use of a differentiator in the form of two series-connected differentiating circuits in the indexing information processing system and connection of a pulse-width modulator improve color rendering at the edges of the screen.

BRIEF DESCRIPTION OF THE DRAWINGS

The invention will be better understood from the following description taken in connection with the accompanying drawings in which.

DETAILED DESCRIPTION OF THE PREFERRED EMBODIMENT

Figure 1:
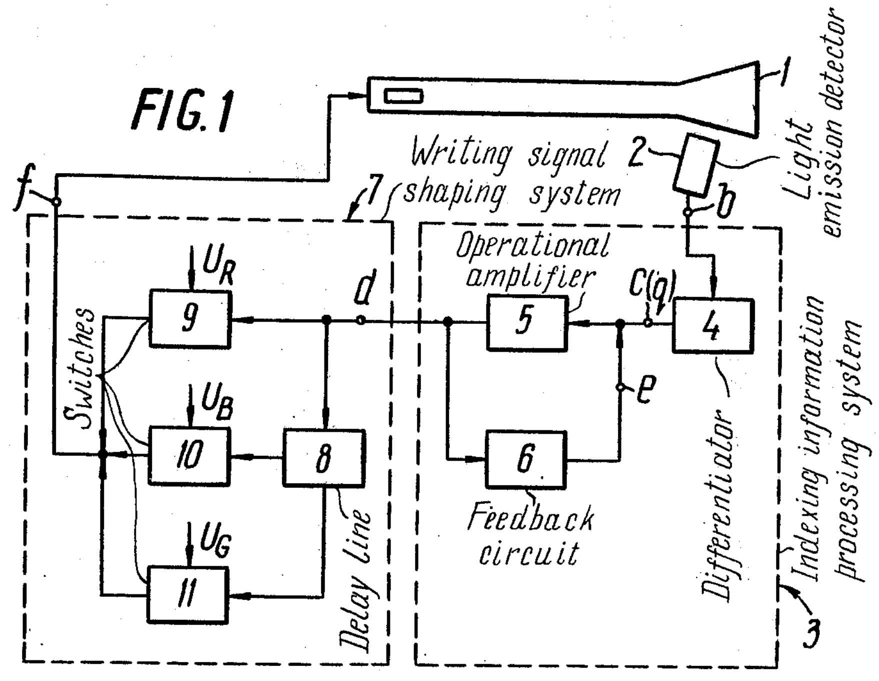
FIG. 1 is a block-diagram of a device for color picture reproduction according to this invention.

Referring to FIG. 1 of the drawings, the device for color picture reproduction comprises a photoelectric-indexing tube 1, an index stripe emission detector 2 (for instance, a photomultiplier), and an indexing information processing system 3 connected to the detector output. The indexing system 3 is composed of a differentiator 4 containing one or two RC-circuits in series arrangement, an operational amplifier 5 connected in series with the differentiator which may be a transistorized multi-stage resistance amplifier, the type of transistor conduction (pen-p or n-p-n) alternating from stage to stage so that no intermediate invertors are needed in any stage, and a feedback circuit 6 of the operational amplifier 5, the feedback circuit 6 comprising a shaping amplifier, for example, in the form of a deeply saturated transistor gate.

The output of the indexing system 3 is coupled to the input of a writing signal shaping system 7 which forms the writing signal out of three primary-color signals $U_R$, $U_G$, $U_B$ fed to the device. The system 7 consists of an index signal delay line 8 whose operation depends, for instance, on the effect of a delay in cutting-off of the gate with respect to the arrival of the cut-off input signal which is due to the fact that the time of diffusion of the minority carriers in the base of a deeply saturated transistor gate is finite; and switches 9, 10, 11 of three primary-color signals $U_R$, $U_G$, $U_B$ which are a combination of transistor gates and an AND circuit having two inputs each.

The first inputs of the switches 9, 10 and 11 are intended for receiving primary-color signals $U_R$, $U_G$ and $U_B$, respectively. The second input of one switch, for example, the switch 9, is connected directly to the output of the indexing system 3, while the second inputs of the other two switches (say 10 and 11) are coupled to the output of the indexing system 3 via the delay line 8. The outputs of all the switches 9, 10, 11 are connected to the control electrode of the gun of the color display tube 1.

Figure 2:
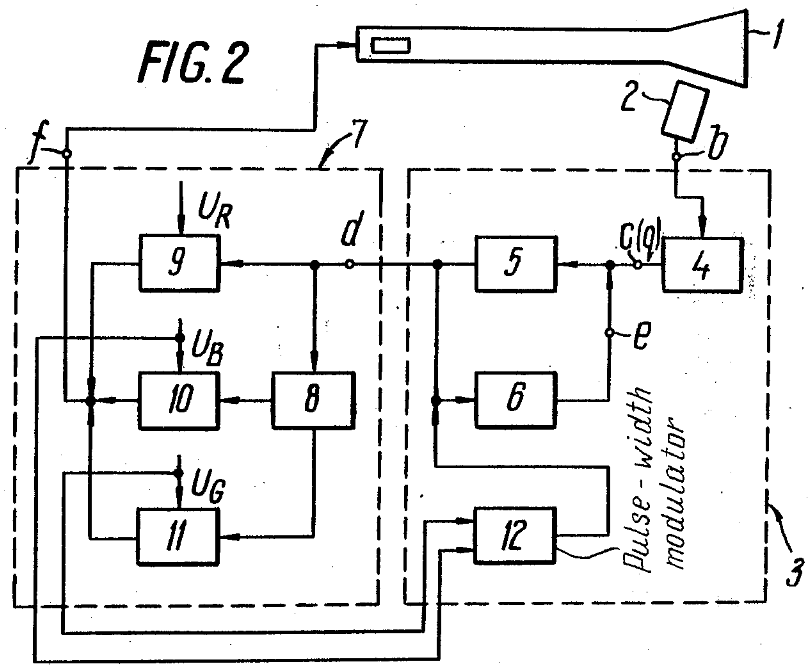
FIG. 2 is a block diagram of one embodiment of this invention with a pulse-width modulator.

The device for color picture reproduction shown in FIG. 2 comprises a photoelectric-indexing tube 1, an index stripe emission detector 2, an indexing information processing system 3, and a writing signal shaping system 7, the basic components of the indexing system 3 and the shaping system 7 being identical with those described above for the embodiment of the invention given in FIG. 1. The device for color picture reproduction shown in FIG. 2 differs from the device illustrated in FIG. 1 in that the indexing system 3 includes additionally a pulsewidth modulator 12 with the output thereof coupled to the input of a feedback shaping amplifier 6, one input being coupled to the first input of a switch 10 and the other input being coupled to the first input of a switch 11.

The above connection of the pulse-width modulator 12 requires that the total time delay of the index signal in the system 3 would be half the frequency of the index signal which is achieved through selecting appropriate characteristics of a differentiator 4 and an operational amplifier 5.

The pulse-width modulator 12 may employ any known principle of operation; for example, dependence of the length of the flat top of a pulse at the output of of a saturated transistor stage on base current.

The screen structure of the picture display tube in the proposed device is shown in FIG. 3*a*.

The color stripes R, G, B are separated by guard stripes H, the width of the guard stripes between the color triplets being equal to three times the width of a guard stripe between the color stripes within one triplet, and index stripes I are located in the middle of guard stripes of width 3H so that the interval between the two extreme color stripes, for example, B and G, and the index stripe I equals the width of the guard stripe H, while all the stripes R, G, B, I, H are of the same width.

FIGS. 3*b, c, d, e, f, g* shows the oscillograms of signals at points *b, c, d, e, f, g* of the embodiments of the invention in FIGS. 1 and 2 which illustrate operation of the device.

The device given in FIG. 1 operates as follows. During scanning by the electron beam, the index stripes I in the screen structure emit ultraviolet light or light near the u.v. region. This emitted u.v. light is collected by a detector 2 whose output signal serves as an index signal of the waveform illustrated in FIG. 3*b*. As the index pattern of the screen has a high duty cycle depending on the ratio of the repetition period $T_1$ of the index stripes I to the scan period of the index stripe I, the output of the detector 2 (FIG. 3*b*) exhibits an explicit non-sine waveform.

The rise time of the index signal in FIG. 3*b* is such that the pulse controlling the operation of the writing signal shaping system 7 with length equal to the scan time of one color stripe R (or B or G) can be obtained by differentiating the signal shown in FIG. 3*b*. The waveform of the signal after passing through a single-circuit differentiator 4 is shown in FIG. 3*c*.

The operational amplifier 5 amplifies, limits and regenerates the index signal. The amplitude of the signal (FIG. 3*d*) at the operational amplifier output must be sufficient to ensure normal operation of the writing signal shaping system 7. The total delay introduced by the detector 2 and the indexing system 3 is not larger than half the frequency of the index signal which extends the total tolerance for picture non-linearity and instability up to 8–10 percent.

The waveform of signals at the second inputs of the switches 10 and 11 of the system 7 is similar to the signal presented in FIG. 3*d* and differs in a time shift related to the pattern of the color stripes R, G, B in the screen structure of the display tube 1.

Required time shifts are provided by a delay line 8. The composite (writing) signal derived at the output of the shaping system 7 which is represented in FIG. 3*f* (white region reproduction is shown) is used for modulating the electron beam of the tube 1. The color signals $U_R$, $U_G$, $U_B$, modulating components of the signal shown in FIG. 3f (pulse-amplitude modulation) are fed to the first inputs of the switches 9, 10, 11 from the decoder of the color television receiver or other source of a color television signal (not shown in FIGS. 1, 2). As the length of individual components of the signal shown in FIG. 3*f* is comparable with the scan period of any color stripe R, G or B, and as the index stripe I is separated from any adjacent color stripe (for instance, B and G) by an interval equal to the scan period of the guard stripe H, effective separation in time of the writing and index signals is provided.

Because of the energy distribution in the electron beam of the gun of the picture tube 1 being close to Gaussian distribution and the electron spot having no strict boundaries, premature (spurious) excitation of the index stripes occurs as the beam hits any color stripe R, G, B. In the proposed device this effect is attenuated by cutting off the operational amplifier 5 for time periods between the appearance of the indexing pulses. This is provided by the shaping amplifier connected in the feedback circuit 6 of the operational amplifier 5. The waveform of the output signal of the shaping amplifier in the feedback circuit 6 is illustrated by the solid line in FIG. 3*e*.

The operation of the device diagrammatically explained in FIG. 2 is in principle similar to the embodiment of the invention of FIG. 1 with the only difference that the shaping amplifier of the feedback circuit 6 receives an additional signal from the output of the pulse-width modulator 12 the first and second inputs of which accept color signals. The color signals must be selected so as to correspond to the preceding and subsequent color stripes (taken in the direction of electron beam scanning). In this embodiment of the invention, such signals are $U_B$, $U_G$. The injection of the above additional signal into the feedback circuit 6 changes the waveform of the signal at point "*e*" of the device so that the length of the flat top of the cut-off signal (see the dashed line in FIG. 3e) becomes proportional to time required for the electron beam to traverse the distance from the index stripe 1 to appropriate color stripes (in this case, B and G).

In the case of an arbitrary combination of primary-color signals $U_R$, $U_G$, $U_B$ the length of the flat top of the cut-off signal for the proposed embodiment of the device must meet the following requirement:

$$T_S = \frac{T_I}{2}[1 - (\alpha U_G - \beta U_B)], \quad (1)$$

$$\text{with} \quad 0 < [1 - (\alpha - \beta)] < 2,$$

where:

$T_S$ is the length of the flat top of the feedback signal at point "*e*" of the device;

$T_I$ = index signal repetition period;

$\alpha, \beta$ = constant coefficients determining the variation range of the feedback signal;

$U_B$, $U_G$ = primary-color signals corresponding to the color stripes (in our case B and G) directly adjacent to the index stripe I, $U_B$ corresponding to the preceding, and $U_G$ to the subsequent stripe in the direction of electron beam scanning.

The coefficients $\alpha$ and $\beta$ in equation (1) are selected during adjustment of the indexing system 3.

The above correction of the feedback signal improves the quality of rendering saturated colors.

Figure 3:
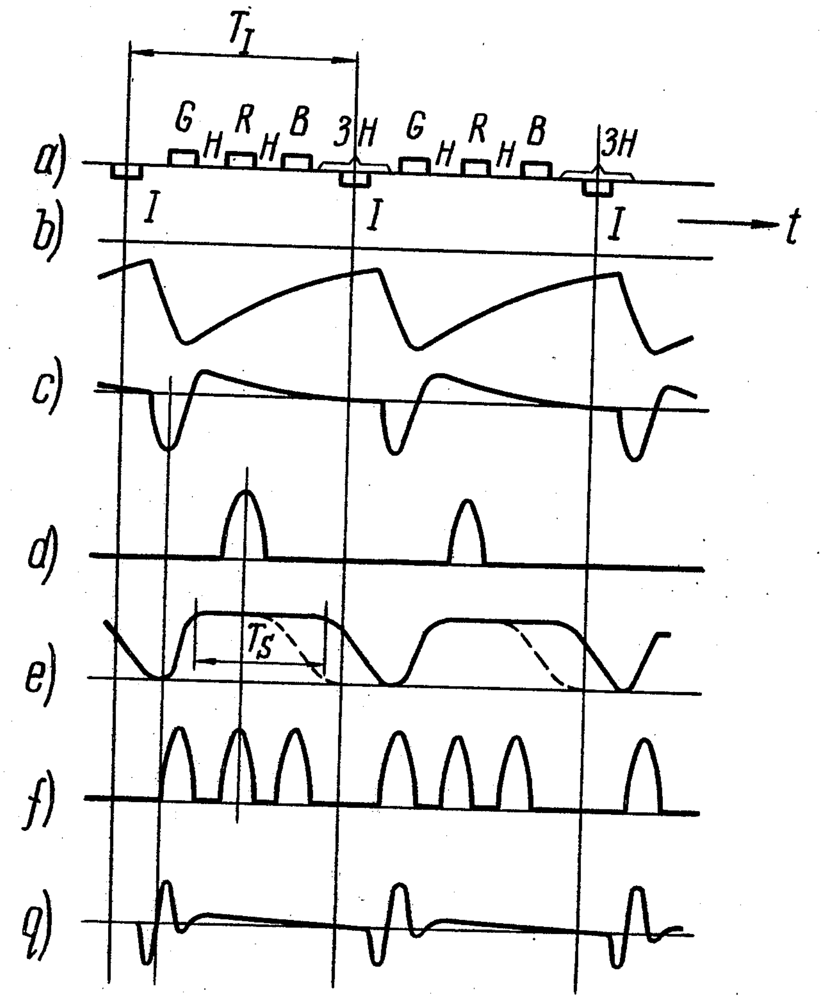
FIG. 3*a* is the screen structure of the proposed device.
FIGS. 3*b*, *c*, *d*, *e*, *f*, *g* are oscillograms of signals at various points of the device illustrating operation of the device.

Double differentiation in the differentiator 4 of the indexing system 3 in both embodiments of the invention shown in FIGS. 1 and 2 makes it possible to attenuate the effect of a non-uniform steepness of the leading edge of the index signal at the output of the detector 2 (FIG. 3) on the output signal of the device at point "*f*." This is an important advantage of the device, since this non-uniform steepness which is caused by variations in the quality of electron beam focussing throughout the screen results in overlapping of adjacent signals at point "*f*" and, consequently, in poor color fidelity at the screen edges. The waveform of the signal at the output of the differentiator 4 after double differentiation is shown in FIG. 3*g*.

What is claimed is:

1. A device for color picture reproduction, said device comprising: a beam-index display tube; said tube having a gun to form a scanning electron beam; said gun having a control electrode; said tube further including a screen having a pattern of color stripe triplets, index stripes, first guard stripes between the color stripes in each triplet and second guard stripes between said color stripe triplets; the width of said second guard stripes being equal to three times the width of said first guard stripes; said index stripes being located in the middle of said second guard stripes; said color stripes and index stripes being adapted to emit light upon the impingement thereon of said scanning electron beam; said light emitted by said index stripes being in or near the ultraviolet region; said device further comprising writing signal shaping system means having four inputs and an output for producing a writing signal from three primary color signals fed to three of said inputs; said output of said system being connected to said control electrode of said gun; said device further comprising an index light detector, a differentiator, and an operational amplifier, each having an input and an output; said device further comprising a feedback circuit of said operational amplifier; said detector receiving at its input said light emitted by said index stripes and producing at its output indexing impulses; the input of said differentiator being connected to the output of said detector, the input of said operational amplifier being connected to the output of said differentiator, and the output of said operational amplifier being connected to the fourth input of said writing signal shaping system means; said feedback circuit being adapted to cut-off said operational amplifier during time intervals between the appearance of said indexing pulses.

2. A device for color picture reproduction, said device comprising: a beam-index display tube; said tube having a gun to form a scanning electron beam; said gun having a control electrode; said tube further including a screen having a pattern of color stripe triplets, index stripes, first guard stripes between the color stripes in each triplet and second guard stripes between the color stripe triplets; the width of said second guard stripes being equal to three times the width of said first guard stripes; said index stripes being located in the middle of said second guard stripes; said color stripes and index stripes being adapted to emit light upon the impingement thereon of said scanning electron beam; the light emitted by said index stripes being in or near the ultraviolet region; said device further comprising a writing signal shaping system, said system having four inputs and an output for producing a writing signal from three primary color signals fed to three of its inputs; said outut of said system being connected to said control electrode of said gun; said device further comprising an index light detector, a differentiator, and an operational amplifier, each having an input and an output; said device further comprising a feedback circuit of said operational amplifier; said detector receiving at its input the light emitted by said index stripes and producing at its output indexing impulses; the input of said differentiator being connected to the output of said detector, the input of said operational amplifier being connected to the output of said differentiator, and the output of said operational amplifier being connected to the fourth input of said writing signal shaping system; said feedback circuit being adapted to cut-off said operational amplifier during time intervals between the appearance of said indexing pulses; said writing signal shaping system including three primary-color switches, a delay line, and a pulse-width modulator; said switches having a plurality of inputs and a common output which output serves as said output of said writing signal shaping system; a first input of each of said switches serving as one of said three inputs of said writing signal shaping system used to feed three primary color signals; a first of said switches, whose second input is connected to said fourth input of said writing signal shaping system, connected to the output of said operational amplifier; said delay line having an input thereof connected to the second input of said first of said switches; outputs of said delay line coupled to the second inputs of the other two of said switches; said pulse-width modulator being connected to and driving said feedback circuit of said operational amplifier, each input of said modulator being connected to each first input of said primary-color switches which receive color signals corresponding to color stripes adjacent to an index stripe.

* * * * *